US 9,058,822 B2

(12) United States Patent
Lee et al.

(10) Patent No.: US 9,058,822 B2
(45) Date of Patent: Jun. 16, 2015

(54) OBJECTIVE LENS DRIVING UNIT AND OPTICAL DISC DRIVE USING THE SAME

(71) Applicant: Toshiba Samsung Storage Technology Korea Corporation, Suwon-si (KR)

(72) Inventors: Young-bin Lee, Suwon-si (KR); Soo-hyun Baek, Hwaseong-si (KR)

(73) Assignee: Toshiba Samsung Storage Technology Korea Corporation, Suwon-si (KR)

( * ) Notice: Subject to any disclaimer, the term of this patent is extended or adjusted under 35 U.S.C. 154(b) by 0 days.

(21) Appl. No.: 14/262,867

(22) Filed: Apr. 28, 2014

(65) Prior Publication Data

US 2014/0325536 A1 Oct. 30, 2014

(30) Foreign Application Priority Data

Apr. 29, 2013 (KR) .................. 10-2013-0047693

(51) Int. Cl.
*G11B 7/00* (2006.01)
*G11B 7/09* (2006.01)

(52) U.S. Cl.
CPC ............ *G11B 7/0933* (2013.01); *G11B 7/0932* (2013.01)

(58) Field of Classification Search
USPC .......... 720/681–687; 369/44.14, 44.15, 44.16
See application file for complete search history.

(56) References Cited

U.S. PATENT DOCUMENTS

| | | | | |
|---|---|---|---|---|
| 5,018,836 A * | 5/1991 | Noda et al. ................. 359/814 |
| 5,446,721 A * | 8/1995 | Sekimoto et al. ........... 720/684 |
| 5,526,340 A * | 6/1996 | Tanaka ......................... 720/685 |
| 5,627,687 A * | 5/1997 | Fujisawa ..................... 359/823 |
| 5,999,501 A | 12/1999 | Tomita et al. |
| 6,084,834 A * | 7/2000 | Kawano et al. ........... 369/44.14 |
| 6,160,771 A * | 12/2000 | Kawano et al. ........... 369/44.15 |
| 6,377,521 B1 * | 4/2002 | Kijima et al. ............. 369/44.23 |
| 6,462,892 B1 * | 10/2002 | Kuroki ......................... 359/813 |
| 6,587,283 B2 * | 7/2003 | Ijima et al. .................. 359/824 |
| 6,768,601 B2 * | 7/2004 | Ju ................................. 359/824 |
| 7,028,318 B2 * | 4/2006 | Tajiri ........................... 720/684 |
| 7,272,840 B2 * | 9/2007 | Cheong et al. ............... 720/683 |
| 7,408,848 B2 * | 8/2008 | Ke et al. .................... 369/44.14 |
| 7,483,222 B2 | 1/2009 | Takahashi |
| 7,543,312 B2 | 6/2009 | Kim et al. |
| 7,558,164 B2 * | 7/2009 | Kim .......................... 369/44.15 |
| 7,869,313 B2 * | 1/2011 | Kim et al. ................. 369/44.14 |
| 7,986,594 B2 * | 7/2011 | Aoki et al. ................ 369/44.15 |
| 8,117,631 B2 * | 2/2012 | Bammert et al. ............ 720/681 |

(Continued)

FOREIGN PATENT DOCUMENTS

JP 2007-200461 8/2007
KR 20-1992-0001745 Y1 3/1992

(Continued)

OTHER PUBLICATIONS

Korean Office Action issued May 1, 2014 in counterpart Korean Patent Application No. 10-2013-0047693 (4 pages, in Korean).

*Primary Examiner* — Brian Miller
(74) *Attorney, Agent, or Firm* — NSIP Law (57) ABSTRACT

Provided is an objective lens driving unit in which a wire holder is coupled to a circuit board. In a conventional objective lens driving unit, a connection between a wire holder and a circuit board may deteriorate over time due to a deterioration of the connection. According to various aspects, a wire holder may be directly coupled to a circuit board by insert molding, thus improving the connection between the wire holder and the circuit board over time.

17 Claims, 11 Drawing Sheets

(56) References Cited

U.S. PATENT DOCUMENTS

| | | | |
|---|---|---|---|
| 8,752,078 B1* | 6/2014 | Lee et al. | 720/685 |
| 2003/0193854 A1* | 10/2003 | Lee et al. | 369/44.16 |
| 2005/0111311 A1 | 5/2005 | Funakoshi | |
| 2008/0030880 A1 | 2/2008 | Takahashi | |
| 2010/0103797 A1* | 4/2010 | Bammert et al. | 369/112.01 |
| 2010/0157779 A1 | 6/2010 | Leki et al. | |
| 2012/0281517 A1* | 11/2012 | Lee et al. | 369/112.23 |
| 2013/0003520 A1* | 1/2013 | Iijima et al. | 369/112.23 |
| 2013/0339987 A1* | 12/2013 | Yun et al. | 720/681 |
| 2013/0339988 A1* | 12/2013 | Baek et al. | 720/681 |
| 2014/0053169 A1* | 2/2014 | Baek et al. | 720/662 |
| 2014/0245330 A1* | 8/2014 | Park | 720/601 |

FOREIGN PATENT DOCUMENTS

| | | |
|---|---|---|
| KR | 10-1999-0054722 A | 7/1999 |
| KR | 10-2005-0033842 A | 4/2005 |
| KR | 10-2007-0025300 A | 3/2007 |
| KR | 10-2008-0073407 A | 8/2008 |

* cited by examiner

OBJECTIVE LENS DRIVING UNIT AND OPTICAL DISC DRIVE USING THE SAME

CROSS REFERENCE TO RELATED APPLICATION(S)

This application claims the benefit under 35 USC §119(a) of Korean Patent Application No. 10-2013-0047693, filed on Apr. 29, 2013, in the Korean Intellectual Property Office, the entire disclosure of which is incorporated herein by reference for all purposes.

BACKGROUND

1. Field

The following description relates to an objective lens driving unit capable of improving vibration characteristics of an objective lens and an optical disc drive using the objective lens driving unit.

2. Description of Related Art

Optical disc drives are used to record data to and read data from an optical disc while the optical disc rotates. For example, an optical disc drive may include a spindle motor to rotate the disc, and an optical pickup to record data to the disc and read data from the disc. In operation the optical pickup may be moved in a radial direction of the disc by a transfer motor.

The optical pickup may include an objective lens driving unit. The objective lens driving unit may have a voice coil motor structure in which a movable part including an objective lens is elastically supported with respect to a fixed part. For example, the movable part may be moved relative to the fixed part in a focusing or tracking direction by a magnetic circuit. In this example, the magnetic circuit may be formed by a driving coil of the movable part and permanent magnets of the fixed part. The objective lens may be driven to obtain uniform recording and reproducing quality.

SUMMARY

In an aspect, there is provided an objective lens driving unit including a movable part comprising an objective lens and a driving coil, a fixed part comprising a wire holder and permanent magnets corresponding to the driving coil, a circuit board directly coupled to the wire holder by insert molding, and a plurality of suspension wires elastically supporting the movable part with respect to the fixed part, wherein ends of the suspension wires are fixed to the circuit board that is directly coupled to the wire holder.

The circuit board may comprise a first region supported on a supporting surface of the wire holder, and a second region extending from the first region and spaced apart from the supporting surface, wherein the ends of the suspension wires are fixed to the second region.

The wire holder may comprise a body comprising the supporting surface, and a coupling portion extending away from the body and at least partially surrounding a portion of a second surface of the circuit board opposite to a first surface of the circuit board that is supported on the supporting surface.

A positioning hole may be formed in the circuit board to receive a positioning pin of an insert molding die.

The objective lens driving unit of claim 4, wherein a pair of positioning holes spaced apart from each other are formed in the circuit board, one of the positioning holes is a circular hole, and the other of the positioning holes is a hole elongated in a direction in which the positioning holes are spaced apart from each other.

The wire holder may comprise an opposite surface facing the second region of the circuit board with a gap therebetween, and a damping material is filled in the gap.

The objective lens may comprise a plurality of objective lenses corresponding to a plurality of optical discs having different recording densities.

In an aspect, there is provided an objective lens driving unit including a movable part on which an objective lens is disposed, a fixed part comprising a wire holder, a circuit board directly coupled to the wire holder by insert molding, and a plurality of suspension wires each comprising a first end fixed to the movable part and a second end fixed to the wire holder that is directly coupled to the circuit board.

The wire holder may comprise a body, and a coupling portion extending away from the body to at least partially surround a portion of the circuit board.

The circuit board may comprise a first region and second regions located on both sides of the first region, wherein the other ends of the suspension wires are fixed to the second regions, and the wire holder may further comprise a supporting surface on which the first region is supported and opposite surfaces having a height different from that of the supporting surface, wherein gaps are formed between the opposite surfaces and the second regions.

The coupling portion may be disposed in the first region.

A first surface of the first region of the circuit board may be supported on the supporting surface, and the coupling portion may at least partially surround a portion of a second surface of the circuit board opposite to the first surface of the circuit board.

The coupling portion may completely surround the second surface of the circuit board opposite to the first surface of the circuit board in a vertical direction of the circuit board.

A damping material may be filled in the gaps between the second regions and the opposite surfaces.

A positioning hole may be formed in the first region of the circuit board to receive a positioning pin of an insert molding die.

A pair of positioning holes spaced apart from each other may be formed in the first region of the circuit board, one of the positioning holes may be a circular hole, and the other of the positioning holes may be a hole elongated in a direction in which the positioning holes are spaced part from each other.

The objective lens may comprise a plurality of objective lenses corresponding to a plurality of optical discs having different recording densities.

In an aspect, there is provided an optical disc drive including a spindle motor configured to rotate an optical disc, and an optical pickup unit configured to access the optical disc while sliding in a radial direction of the optical disc so as to record/read information, the optical pickup unit comprising an objective lens driving unit comprising a movable part on which an objective lens is disposed, a fixed part comprising a wire holder, a circuit board directly coupled to the wire holder by insert molding, and a plurality of suspension wires comprising ends fixed to the movable part and the other ends fixed to the wire holder that is directly coupled to the circuit board.

The objective lens may comprise a plurality of objective lenses corresponding to a plurality of optical discs having different recording densities.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses and/or systems described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, an objective lens driving unit and an optical disc drive including the objective lens driving unit are described with reference to the accompanying drawings.

Figure 1:
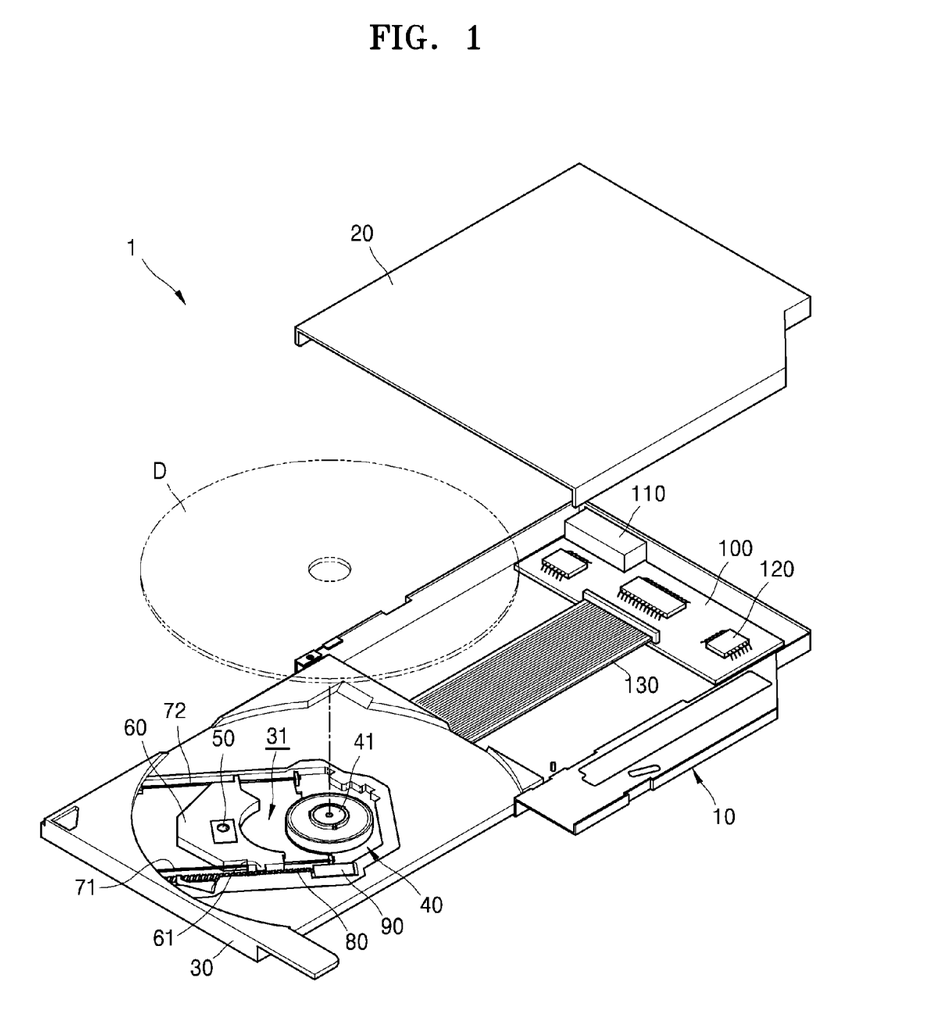
FIG. 1 is a diagram illustrating an example of an exploded perspective view of an optical disc drive.

FIG. 1 illustrates an example of an exploded perspective view of an optical disc drive 1. Referring to FIG. 1, the optical disc drive 1 includes a spindle motor 40 to rotate a disc D, and an optical pickup unit 50 to emit light to the disc D for reading data from the disc D and recording data on the disk D. The optical pickup unit 50 is disposed on a pickup base 60 which moves in a radial direction of the disc D.

In this example, a main frame 10 functions as a main chassis. A tray 30 is able to receive the disc D thereon and is slidable on the main frame 10. A cover 20 covers the topside of the main frame 10 while forming a space therebetween to allow the tray 30 to enter the space. The tray 30 may include a locking unit (not shown) configured to selectively lock the tray 30 in the main frame 10 and unlock the tray 30 from the main frame 10.

A plurality of components such as the spindle motor 40 and the pickup base 60 may be disposed on the tray 30. A turntable 41 including a rotation shaft for coupling with the disc is disposed on the spindle motor 40, and the optical pickup unit 50 is disposed on the pickup base 60. The tray 30 also includes a cavity 31 in the form of a recess or vertical penetration opening, and the pickup base 60 is slidable in the cavity 31. Guide shafts 71 and 72 are disposed on both sides of the cavity 31 to guide the pickup base 60 and the pickup base 60 is supported on the guide shafts 71 and 72. A lead screw 80 has a length in the moving direction of the pickup base 60 and is disposed on a side of the cavity 31. A lead guide 61 is disposed on a side of the pickup base 60 and is inserted into a helical groove of the lead screw 80. A transfer motor 90 is used to rotate the lead screw 80. For example, the transfer motor 90 may be a stepping motor, and a rotation shaft of the transfer motor 90 may be connected to the lead screw 80 or constructed of one piece with the lead screw 80.

A main control board 100 is disposed on the main frame 10. For example, the main control board 100 may include a main connector 110 for connecting to an external power supply (not shown) and/or a host apparatus (such as a computer) including the optical disc drive 1. The main control board 100 may also include a driving circuit unit 120 to drive the optical disc drive 1. For example, components such as the optical pickup unit 50 and the spindle motor 40 may be connected to the main control board 100 through a main connection cable 130 which in this example is a flat cable.

Figure 2:
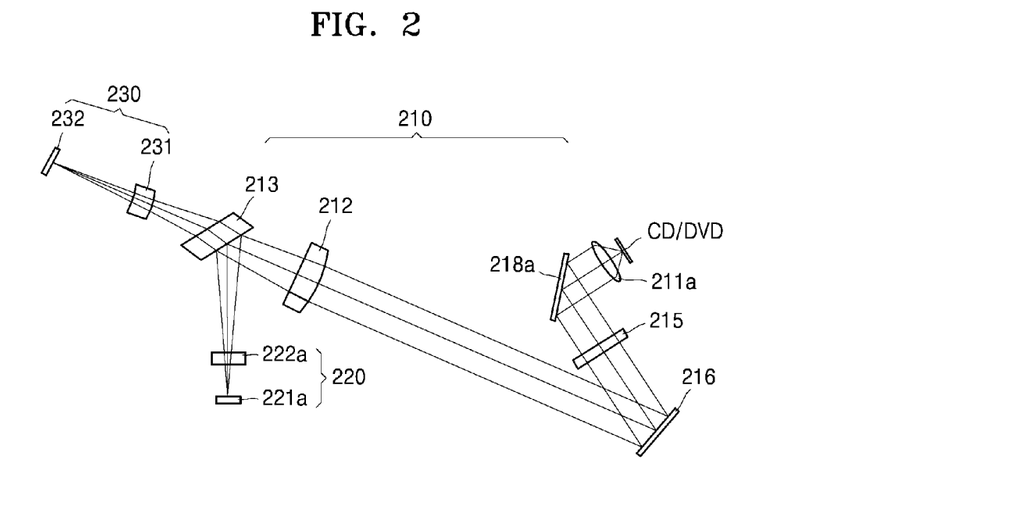
FIG. 2 is a diagram illustrating an example of an optical structure of an optical pickup unit of the optical disc drive of FIG. 1.

FIG. 2 illustrates an example of an optical pickup unit 50. In the example of FIG. 2, the optical pickup unit 50 is for compact discs/digital versatile discs (CDs/DVDs). Referring to FIG. 2, the optical structure includes an optical transmission system 210, a light source system 220, and a light receiving system 230. The light source system 220 may provide a plurality of beams (for example, three beams such as a central main beam and first and second sub-beams beside the central main beam) for reading data from a CD/DVD and/or recording data on a CD/DVD. The light receiving system 230 includes a light receiving device 232 which is used to generate electric process signals such as data signals and tracking error signals (TESs). When reading data from a CD/DVD, the light receiving device 232 may receive three light beams reflected from the CD/DVD using three light receiving cells and may generate data signals corresponding thereto.

In this example, the light source system 220 includes a CD/DVD light source 221a and a grating element 222a. A beam emitted from the light source 221a is incident on a first beam splitter 213 through the grating element 222a. A beam incident on the grating element 222a may be split into a main beam and ±primary sub-beams by diffraction.

The light receiving system 230 includes the light receiving device 232 to detect three beams reflected from the CD/DVD and incident thereon through the first beam splitter 213 and to generate electric signals according to the detected three beams. The light receiving system 230 also includes a sensing lens 231 configured to condense a main beam and first and second sub-beams propagating at both sides of the main beam and to provide the condensed beams to the light receiving device 232.

The optical transmission system 210 includes an objective lens 211a corresponding to the CD/DVD, optical path changing mirrors 216 and 218a, a quarter wave plate (QWP) 215, a collimating lens 212, and the first beam splitter 213. The first beam splitter 213 may reflect three beams coming from the light source system 220 toward the objective lens 211a. In addition, the first beam splitter 213 may transmit beams reflected from the CD/DVD so that the beams may be incident on the light receiving system 230.

Figure 3:
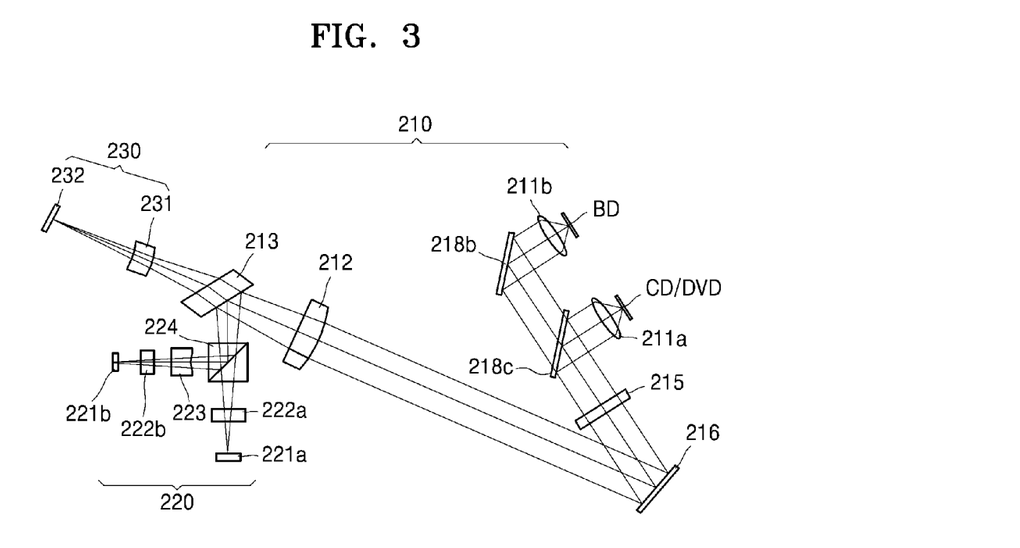
FIG. 3 is a diagram illustrating an example of an optical pickup unit of the optical disc drive of FIG. 1.

FIG. 3 illustrates another example of an optical pickup unit 50. In this example, the optical pickup unit 50 is for CDs/DVDs and Blu-ray discs (BDs).

A total reflection mirror 218b is disposed under an objective lens 211b corresponding to a BD, and a dichromatic mirror 218c transmitting blue light is disposed under an objective lens 211a corresponding to a CD/DVD. The total reflection mirror 218b and the dichromatic mirror 218c are arranged along an optical path from an optical path changing mirror 216. Light coming from a first beam splitter 213 is reflected by the optical path changing mirror 216 toward the dichromatic mirror 218c. Likewise, light reflected from the CD/DVD and BD is reflected by the optical path changing mirror 216 toward the first beam splitter 213.

In this example, the light source system 220 includes a CD/DVD light source 221a corresponding to the CD/DVD, and also a BD light source 221b corresponding to the BD. The CD/DVD light source 221a and the BD light source 221b emit light toward two respective light-incident sides of a second beam splitter 224 that has a cubic shape. A coupling lens 223 is disposed between the BD light source 221b and the second beam splitter 224 and may be used to adjust an optical distance from the BD light source 221b to the BD by controlling optical magnification (that is, by controlling the defocusing amount of propagating light).

Light emitted from the CD/DVD light source 221a and the BD light source 221b is directed toward the first beam splitter 213 by traveling through the second beam splitter 224. A CD/DVD grating element 222a is disposed between the second beam splitter 224 and the CD/DVD light source 221a, and a BD grating element 222b is disposed between BD light source 221b and the second beam splitter 224. The CD/DVD grating element 222a and the BD grating element 222b form a main beam and ±primary sub-beams. Intervals between the main beam and the ±primary sub-beams may be varied according to the lattice distances of the CD/DVD grating element 222a and the BD grating element 222b.

Figure 4:
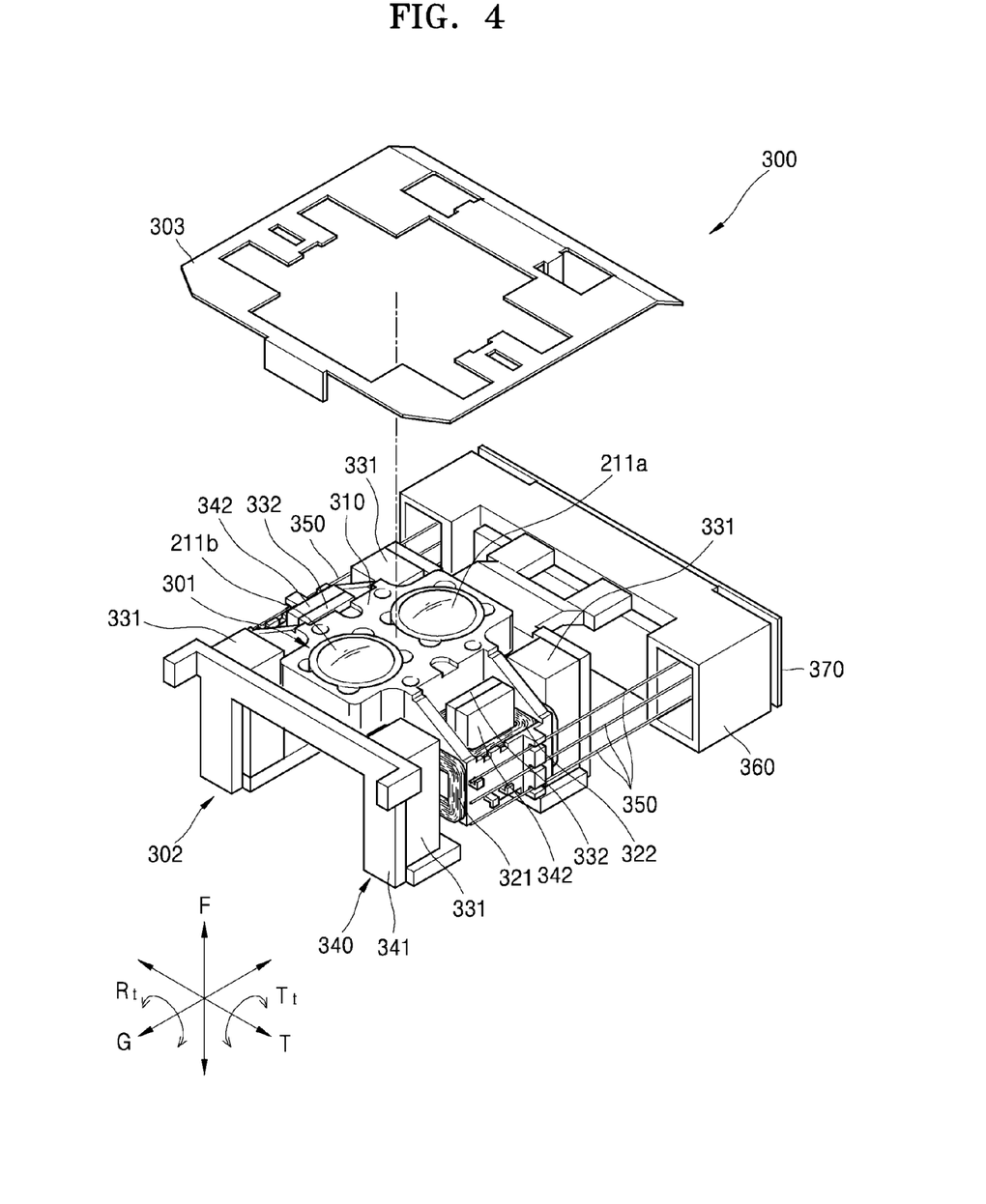
FIG. 4 is a diagram illustrating an example of an objective lens driving unit.

In some examples, the optical elements such as the optical transmission system 210, the light source system 220, and the light receiving system 230 shown in FIGS. 2 and 3 may be disposed on the pickup base 60, but the objective lenses 211a and 211b may not be disposed on the pickup base 60. For example, the objective lenses 211a and 211b may be moved in a focusing and tracking direction for accessing data tracks of a disc D. To move the objective lenses, an objective lens driving unit is provided. FIG. 4 illustrates an objective lens driving unit 300. The objective lens driving unit 300 shown in FIG. 4 for the optical pickup unit 50 includes both the objective lenses 211a and 211b.

Referring to FIG. 4, the objective lenses 211a and 211b are disposed on a blade 310. The blade 310 includes driving coils 321 and 322. In this example, the driving coils 321 are tracking coils for moving the blade 310 in a tracking direction T, and the driving coils 322 are focusing coils for moving the blade 310 in a focusing direction F. For example, two pairs of driving coils 321 may be disposed on both sides of the blade 310 in a tangential direction G of the blade 310. Here, the driving coils 322 may be disposed on both sides of the blade 310 in the tracking direction T of the blade 310, respectively. A movable part 301 is formed by the blade 310 including the objective lenses 211a and 211b and the driving coils 321 and 322.

Four magnets 331 respectively corresponding to the (four) driving coils 321 are provided to form a magnetic circuit for tracking. The magnets 331 may be provided in pairs with the driving coils 321 being disposed therebetween. Yokes 341 are disposed on outer sides of the magnets 331. The yokes 341 are outer yokes supporting the permanent magnets 331 and forming a closed-loop magnetic circuit. The yokes 341 may increase an electromagnetic force for driving the blade 310.

Magnets 332 form a magnetic circuit for focusing, together with the driving coils 322. Yokes 342 (inner yokes) support the permanent magnets 332 and concentrate magnetic vectors generated by the permanent magnets 332 on the driving coils 322 for improving the sensitivity of focusing. The yokes 341 and 342 may be formed in a single yoke structure 340 through a metal plate bending process.

For example, the directions of currents flowing in the pair of driving coils 322 disposed on both sides of the blade 310 in the tracking direction T may be controlled so as to induce electromagnetic forces on the pair of driving coils 322 in the same direction (that is, in the direction −F or +F) for focusing the blade 310. In addition, electromagnetic forces may be induced on the driving coils 322 in opposite directions (that is, in the directions −F and +F) for tilting the blade 310 in a radial tilt direction $R_r$.

The blade 310 is supported by a plurality of suspension wires 350. In this example, the suspension wires 350 are disposed on both sides of the blade 310 in the tracking direction T and may extend in the tangential direction G. Ends of the suspension wires 350 are fixed to a circuit board 370 provided on a wire holder 360, and the other ends of the suspension wires 350 are fixed to the blade 310. Other circuit boards (not shown) may be disposed on both sides of the blade 310 in the tracking direction T for fixing the suspension wires 350 thereto. In this example, the circuit board 370, the suspension wires 350, and the driving coils 321 and 322 may be electrically connected to each other.

The permanent magnets 331 and 332, the yokes 341 and 342, and the wire holder 360 together form a fixed part 302. For example, the fixed part 302 may be fixed to the pickup base 60 (refer to FIG. 1). In this example, the movable part 301 is elastically supported with respect to the fixed part 302 by the suspension wires 350.

A magnetic circuit for driving the movable part 301 is not limited to the example shown in FIG. 4. For example, more driving coils and permanent magnets may be arranged to adjust the degree of freedom of the movable part 301 moving in the focusing direction F, tracking direction T, radial tilt direction $R_r$, and tangential tilt direction $T_t$. In FIG. 4, three pairs of suspension wires 350 are shown. However, the embodiments herein are not limited thereto. For example, the number of suspension wires 350 may be varied according to the number of driving coils and the degree of driving freedom. A protective cover 303 may also be provided. The protective cover 303 may be supported on the yokes 341 and 342.

According to various aspects herein, the circuit board 370 may be fixed to the wire holder 360. For example, the wire holder 360 may be coupled to the circuit board 370.

Figure 5:
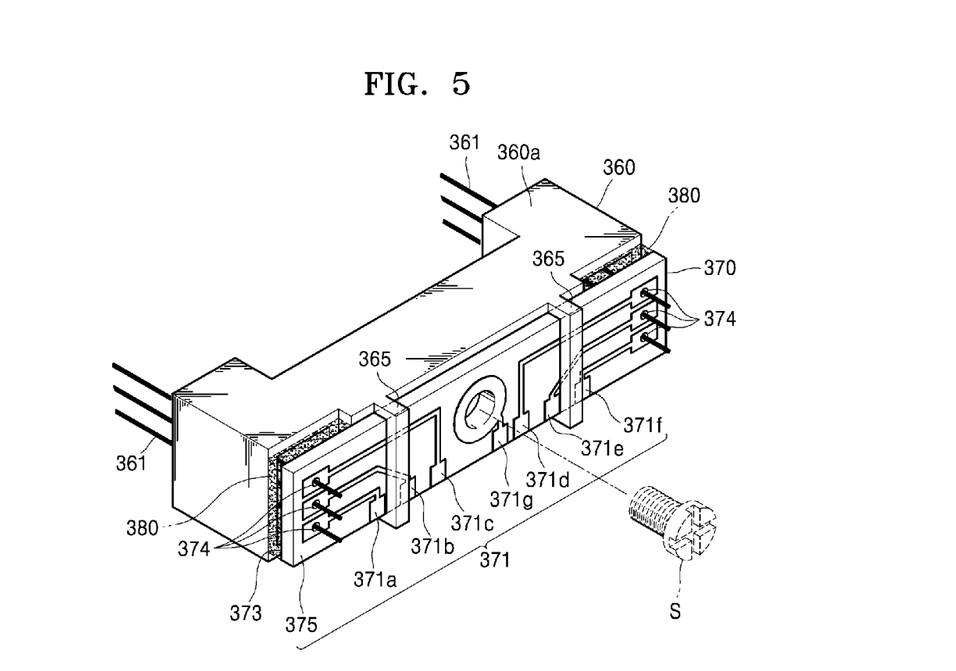
FIG. 5 is a diagram illustrating an example of a coupled relationship between a wire holder and a circuit board.
Figure 6:
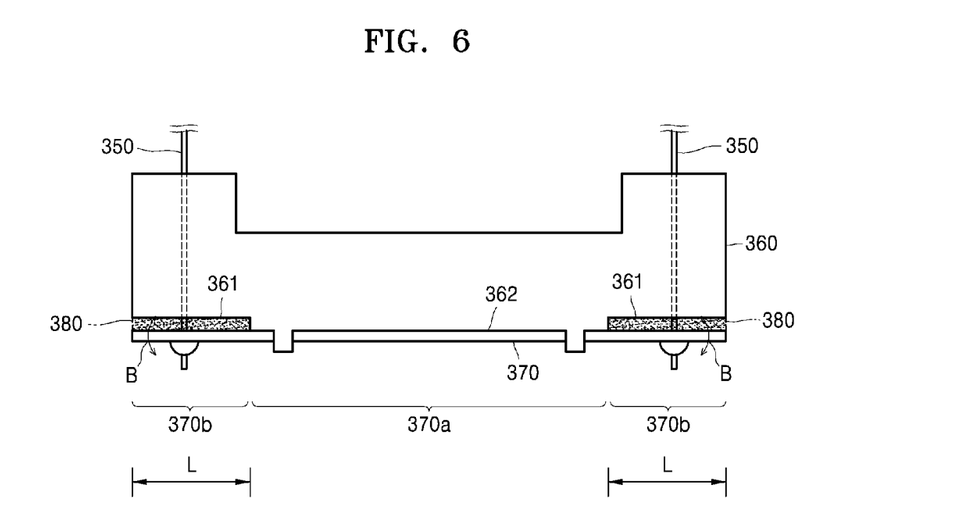
FIG. 6 is another diagram illustrating an example of the coupled relationship between the wire holder and the circuit board.

FIG. 5 illustrates an example of a coupled relationship between the circuit board 370 and the wire holder 360, and FIG. 6 illustrates an example of a plan view of the coupled relationship between the circuit board 370 and the wire holder 360.

Referring to FIGS. 5 and 6, the circuit board 370 includes circuit lines 371 to supply current to the driving coils 321 and 322 through the suspension wires 350. For example, the circuit board 370 may include a plurality of circuit lines 371a to 371f respectively corresponding to the suspension wires 350. Fixing portions 374 are formed on ends of the circuit lines 371a to 371f, and the suspension wires 350 may be fixed to the fixing portions 374 by soldering. The circuit line 371g may be a ground line. For example, the circuit lines 371a to 371f may be electrically connected to a main control board 100 through the main connection cable 130 (shown in FIG. 1). In this example, current applied from the main control board 100 to the driving coils 321 and 322 through the circuit board 370 and the suspension wires 350 may be controlled to move the movable part 301 in a desired direction.

The wire holder 360 includes a supporting surface 362, and opposite surfaces 361 formed at both sides of the supporting surface 362 and having a height different from that of the supporting surface 362. The circuit board 370 includes a first region 370a supported on the supporting surface 362 of the wire holder 360, and second regions 370b extending from the first region 370a so that the suspension wires 350 may be fixed thereto. The first region 370a makes surface contact with the supporting surface 362 and is fixed to the supporting surface 362, and the second regions 370b are spaced apart from the opposite surfaces 361 of the wire holder 360. According to various aspects, because the first region 370a is in contact with and fixed to the supporting surface 362 of the wire holder 360, the first region 370a may be rigidly maintained. Accordingly, the circuit board 370 may not be broken in a manufacturing process or may not be deformed with time, thereby reducing or preventing changes in the driving characteristics of the objective lens driving unit 300. In addition, as shown in portions B in FIG. 6, the second regions 370b and the damping members 380 may function as a vibration damper while being flexibly moved according to vibratory force causing a subsidiary resonance.

In a mass production line, the objective lens driving unit 300 may be manufactured in such a manner that the lengths L of the second regions 370b are maintained constant, to obtain uniform frequency response characteristics of the objective lens driving unit 300 and thus to obtain uniform damping effects.

Figure 7A:
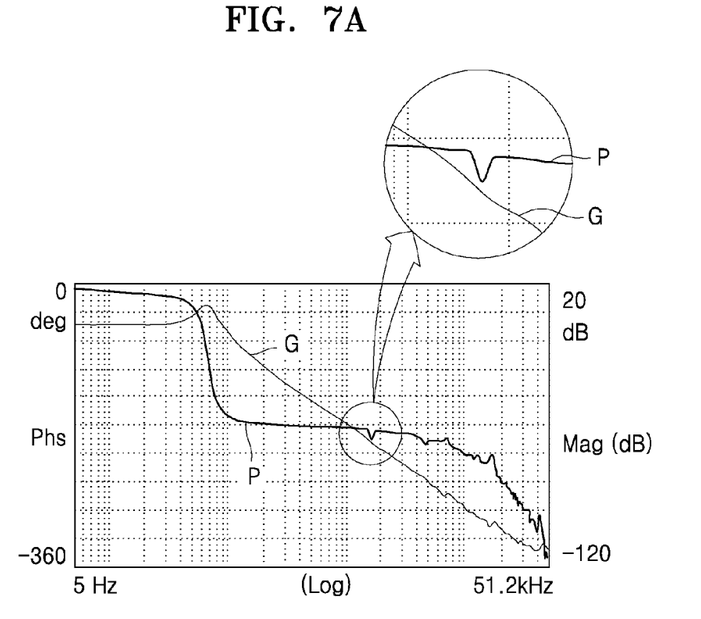
FIGS. 7A and 7B are graphs illustrating examples of frequency response characteristics of an objective lens driving unit in which a wire holder and a circuit board are coupled to each other by a screw.
Figure 7B:
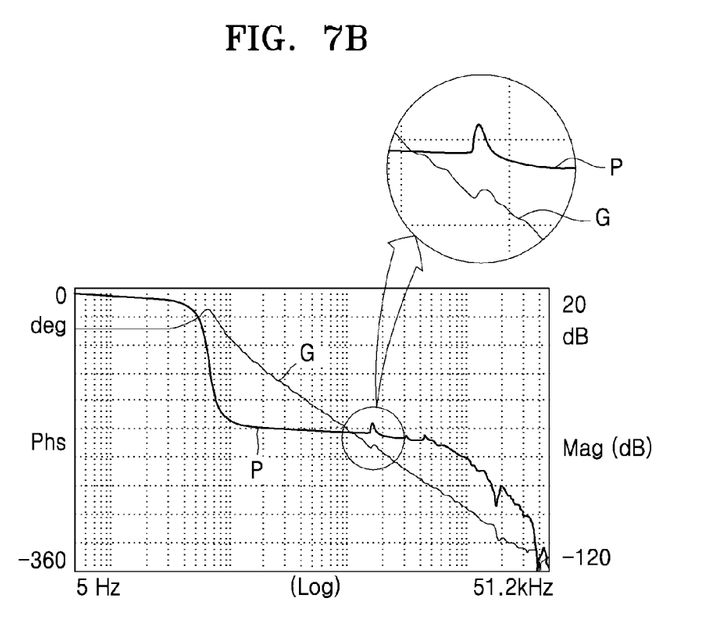

In one example, the circuit board 370 may be bonded to the wire holder 360 using an adhesive or may be coupled to the wire holder 360 using a screw S as shown by dashed lines in FIG. 5. In this case, however, the lengths L of the second regions 370b may not be constant. FIGS. 7A and 7B are graphs showing measured frequency response characteristics of an objective lens driving unit manufactured by a coupling method using adhesive. In this example, P refers to a phase curve, and G refers to a gain curve. Referring to the enlarged portions of FIGS. 7A and 7B, subsidiary resonances are observed in a region of several kilo hertz (kHz).

Subsidiary resonance may occur when the substantial center of gravity of the movable part 301 is not appropriately aligned with the driving center of a magnetic circuit. Although the alignment between the gravity center and the driving center is a structural factor to be considered in design, misalignment may be caused by differences between design specifications and actual features of manufactured components of the movable part 301 and the fixed part 302. Subsidiary resonance may lower the driving sensitivity of the objective lens driving unit 300 and the recording/reading quality of the optical disc drive 1. In addition, referring to FIGS. 7A and 7B, the subsidiary resonances has opposite phases. This may be caused by non-constant lengths L of the second regions 370b of the circuit board 370 improperly coupled to the wire holder 360. Accordingly, if the phase of subsidiary resonance is not constant, it may be difficult to servo-control the objective lens driving unit 300, and thus the recording/reading quality of the optical disc drive 1 may not be uniform.

As another example, if the circuit board 370 is coupled to the wire holder 360 using a screw (S), the coupling force between the circuit board 370 and the wire holder 360 may not be uniform because the screw (S) may not be constantly tightened. As a result, the circuit board 370 may be broken to lower the productivity of a manufacturing line. Furthermore, if the objective lens driving unit 300 is used over a long period of time, the circuit board 370 may be separated from the supporting surface 362 or may be deformed. In this example, the driving characteristics of the objective lens driving unit 300 may be varied with time to lower reliability.

According to various aspects, the wire holder 360 may be formed of a plastic material through a molding process. Accordingly, the circuit board 370 and the wire holder 360 may be coupled to each other through an insert forming process such as insert molding. For example, if the wire holder 360 is formed through a molding process, the circuit board 370 may be inserted into a die set 1000 (refer to FIG. 8A) so as to be coupled to the wire holder 360 at the same time as the formation of the wire holder 360.

Referring again to FIGS. 5 and 6, the wire holder 360 includes coupling portions 365 for coupling with the circuit board 370. According to various aspects, the coupling portions 365 may extend from a body 360a of the wire holder 360 to partially surround or hold a second surface 375 of the circuit board 370 opposite to a first surface 373 of the circuit board 370 facing the supporting surface 362. Although two coupling portions 365 are shown in FIGS. 5 and 6, the embodiments of the present invention are not limited thereto. That is, one, two, three, or more coupling portions 365 may be formed.

In the example of FIGS. 5 and 6, the coupling portion 365 has a top surface and a bottom surface which extend away from the wire holder to allow the circuit board 370 to be securely placed therein. A third surface that extends from the top surface to the bottom surface of the coupling portion 365 comprises an inner portion which contacts the circuit board 370 to create a snug fit. As a result, the circuit board 370 is securely coupled with the wire holder 365 without the use of adhesive and without the use of an external connecting member such as a screw. Furthermore, the coupling portion 365 will maintain a secure couple between the wire holder 360 and circuit board 370 even over a long period of time.

In this example, each coupling portion 365 completely surrounds the second surface 375 (i.e. in the vertical direction) of the circuit board 370. As is further described herein, in another example, the coupling portion may partially but not completely surround the second surface 375 of the circuit board 370.

Figure 8A:
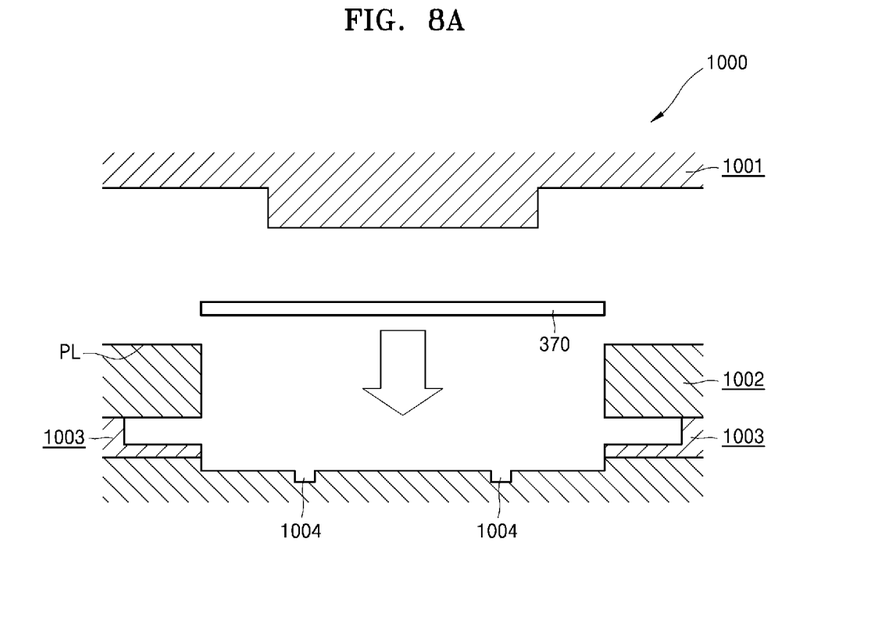
FIGS. 8A, 8B, and 8C are diagrams illustrating how a wire holder and a circuit board are coupled by insert molding.
Figure 8B:
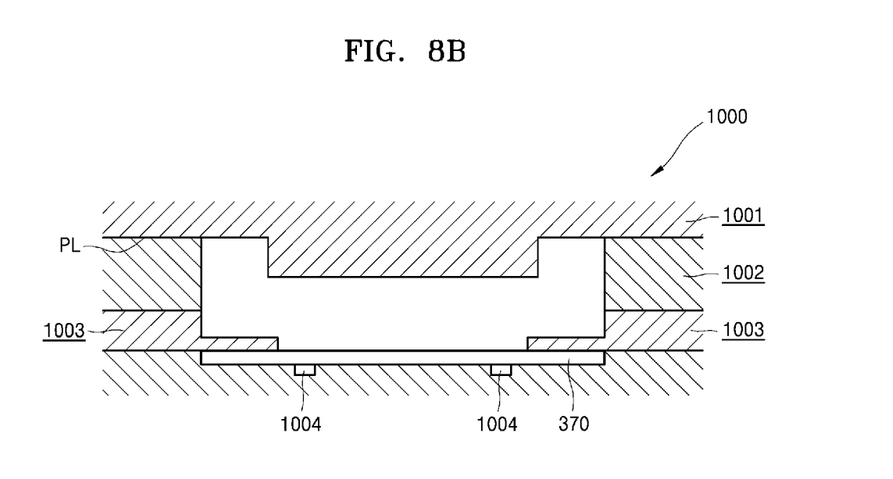
Figure 8C:
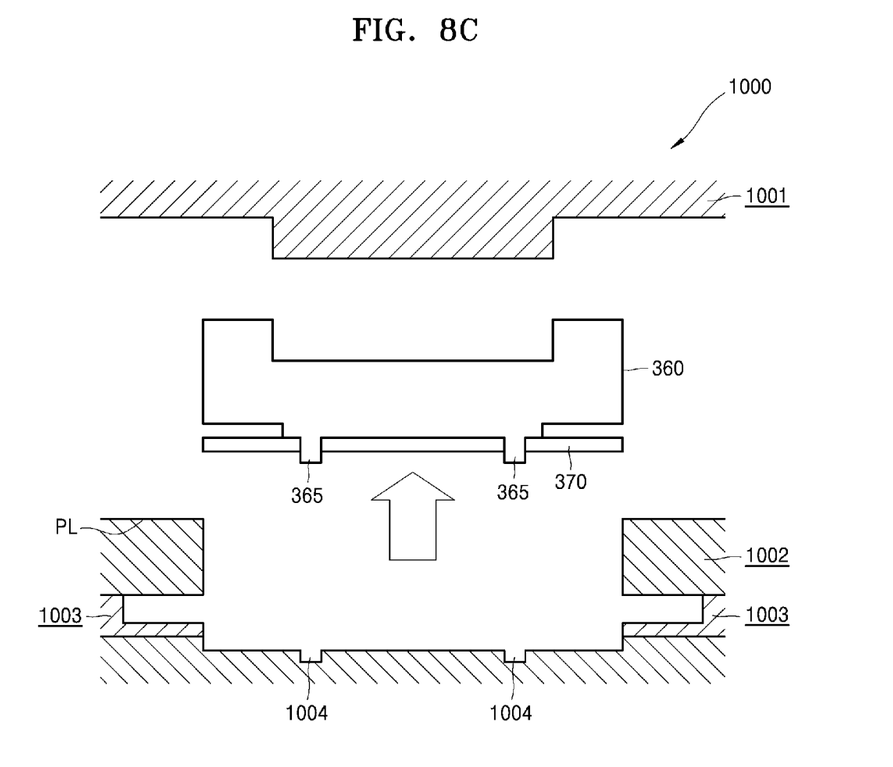

FIGS. 8A, 8B, and 8C are schematic views illustrating an insert molding process. In the examples of FIGS. 8A, 8B, and 8C, an upper die 1001 and a core 1002 of the die set 1000 for forming the wire holder 360 are not specifically shown, and the wire holder 360 and the circuit board 370 are shown only in outline.

Referring to FIG. 8A, the upper die 1001 and the core 1002 are separated from each other to open the die set 1000. Coupling portion shapes 1004 corresponding to the coupling portions 365 of the wire holder 360 are formed in the core 1002. Reference numeral 1003 denotes slides. The slides 1003 are used to fill gaps (undercuts) between the second regions 370b of the circuit board 370 and the opposite surfaces 361 of the wire holder 360. When the die set 1000 is opened, the slides 1003 may be slid outward so that the circuit board 370 may be inserted into the core 1002. After the slides 1003 are slid outward, the circuit board 370 may be inserted into the core 1002. At this time, the circuit board 370 may be guided by the shape of the core 1002 and placed at a predetermined position of the core 1002.

Next, the die set 1000 may be closed by bringing the upper die 1001 and the core 1002 close to each other. Then, as shown in FIG. 8B, a parting line PL is formed between the upper die 1001 and the core 1002 coupled to each other, and the slides 1003 are slid inward to fill the gaps between the opposite surfaces 361 of the wire holder 360 and the second regions 370b of the circuit board 370. In this example, the shape of the wire holder 360 is formed in the die set 1000. A molten plastic resin may be injected into the die set 1000 through a gate (not shown) and kept for a predetermined period of time. Then, the wire holder 360 is formed in a state in which the circuit board 370 is coupled to the wire holder 360. Thereafter, as shown in FIG. 8C, the die set 1000 is opened, and the wire holder 360 to which the circuit board 370 is coupled may be separated from the die set 1000.

If the circuit board 370 is coupled to the wire holder 360 by the insert molding example as described above, because the position of the circuit board 370 is determined by the shape of the die set 1000 (specifically, the shape of the core 1002), the coupling positions of the circuit board 370 and the wire holder 360 may be constant. In this way, assemblies of wire holders 360 and circuit boards 370 may be manufactured with uniform quality in a mass production line. Accordingly, wire holders 360 and circuit boards 370 may be assembled while maintaining constant the lengths L of second regions 370b of the circuit board 370. In addition, because the supporting surface 362 of the wire holder 360 is formed of a molten plastic resin, the supporting surface 362 and the first surface 373 of the circuit board 370 are securely fixed to each other. Therefore, although the objective lens driving unit 300 is used for a long period of time, the circuit board 370 and the wire holder 360 may not be separated from each other, or the circuit board 370 may be less deformed or may not deformed. Accordingly, operational characteristics of the objective lens driving unit 300 may not deteriorate with time. In addition, because the circuit board 370 is less likely to be damaged or broken while being coupled to the wire holder 360, the productivity of a manufacturing line may be improved.

Figure 9:
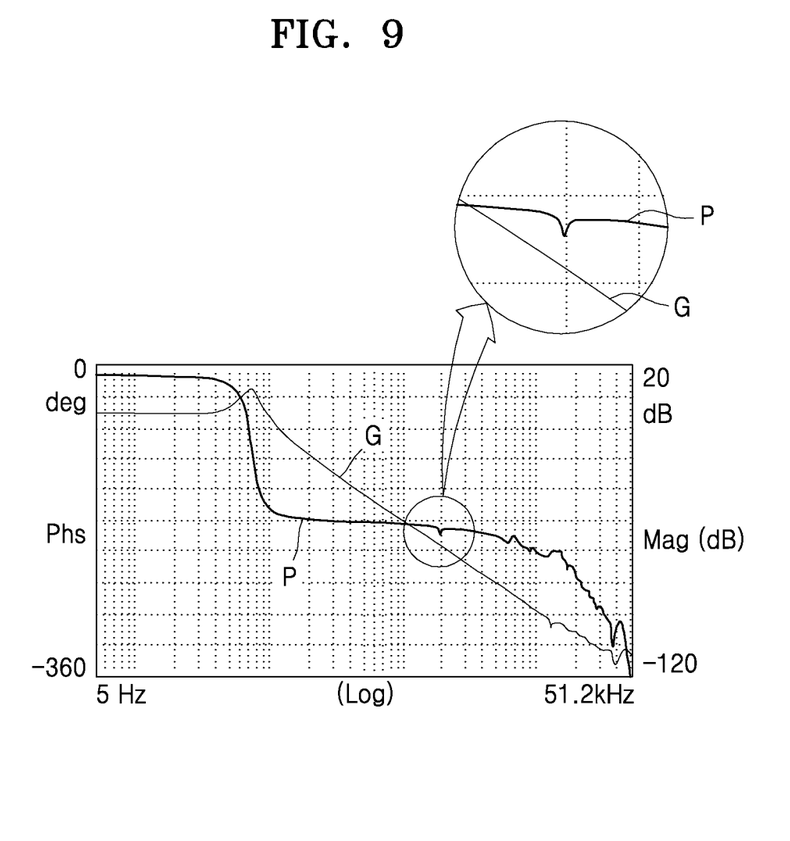
FIG. 9 is a graph illustrating an example of frequency response characteristics of an objective lens driving unit in which a wire holder and a circuit board are coupled by insert molding.

FIG. 9 is a graph showing an example of measured frequency response characteristics of an objective lens driving unit in which a wire holder 360 and a circuit board 370 are coupled to each other by insert molding. Referring to FIG. 9, a weak subsidiary resonance is observed in a region of several kilo hertz (kHz). In addition, during a plurality of measurements, the frequency response characteristics of the objective lens driving unit were uniform. The reason for this is because the lengths L of second regions 370b of the circuit board 370 having a resonance damping function are constant.

As shown in FIGS. 5 and 6, damping members 380 are disposed between the second regions 370b of the circuit board 370 and the opposite surfaces 361 of the wire holder 360. In FIG. 5, the damping members 380 have a rectangular plate shape, however, the shapes of the damping members 380 are not limited thereto. For example, the damping members 380 may be formed by filling the gaps between the wire holder 360 and the circuit board 370 with a damping material after the wire holder 360 and the circuit board 370 are coupled and the suspension wires 350 are soldered to the fixing portions 374 provided on the ends of the circuit lines 371a to 371f. For example, the damping material may a gel-type damping paint that has a predetermined damping coefficient.

Figure 10:
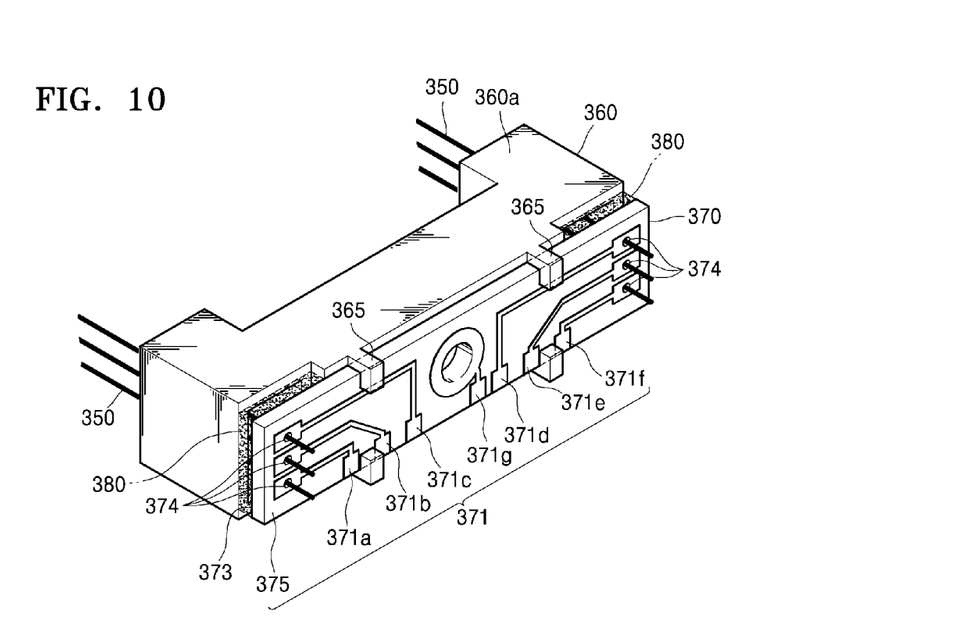
FIG. 10 is a diagram illustrating another example of a coupled relationship between a wire holder and a circuit board.

In FIGS. 5 and 6, the coupling portions 365 extend across the second surface 375 of the circuit board 370. However, the embodiments of the present invention are not limited thereto. As another example, as shown in FIG. 10, coupling portions 365 may be formed to partially cover or hold the second surface 375 of the circuit board 370.

In the previous embodiment, the circuit board 370 is guided in the die set 1000 by the shape of the core 1002. However, the embodiments of the present invention are not limited thereto.

Figure 11:
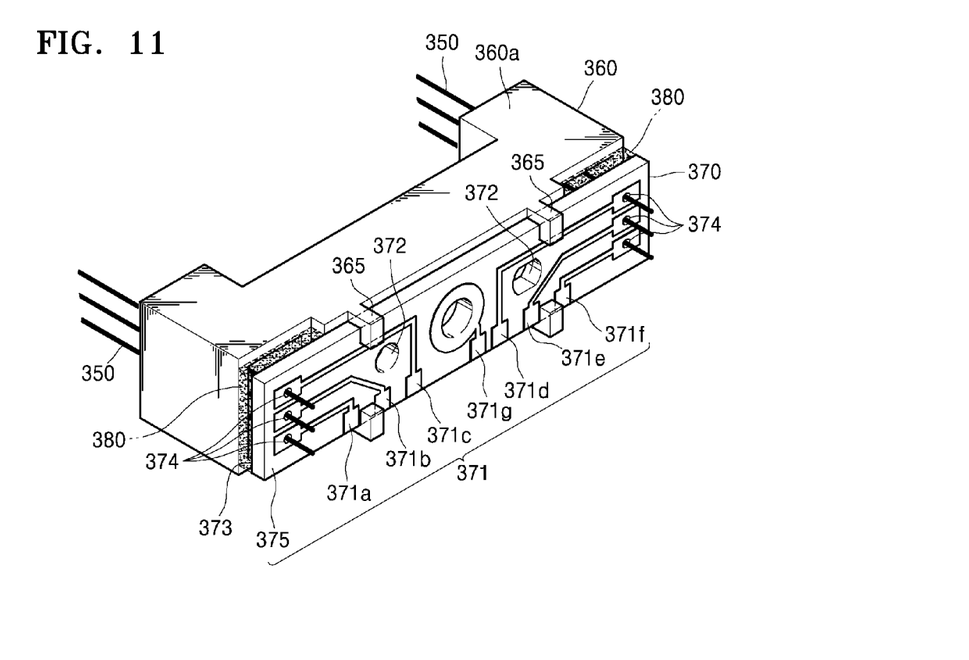
FIG. 11 is a diagram illustrating another example of a coupled relationship between a wire holder and a circuit board.

As shown in FIG. 11, positioning holes 372 are formed in the circuit board 370 so as to determine the position of the circuit board 370 in the die set 1000. The positioning holes 372 are spaced apart from each other. One of the positioning holes 372 may be a circular penetration hole, and the other of the positioning holes 372 may be a hole elongated in a direction which the positioning holes 372 are spaced apart from each other.

Figure 12:
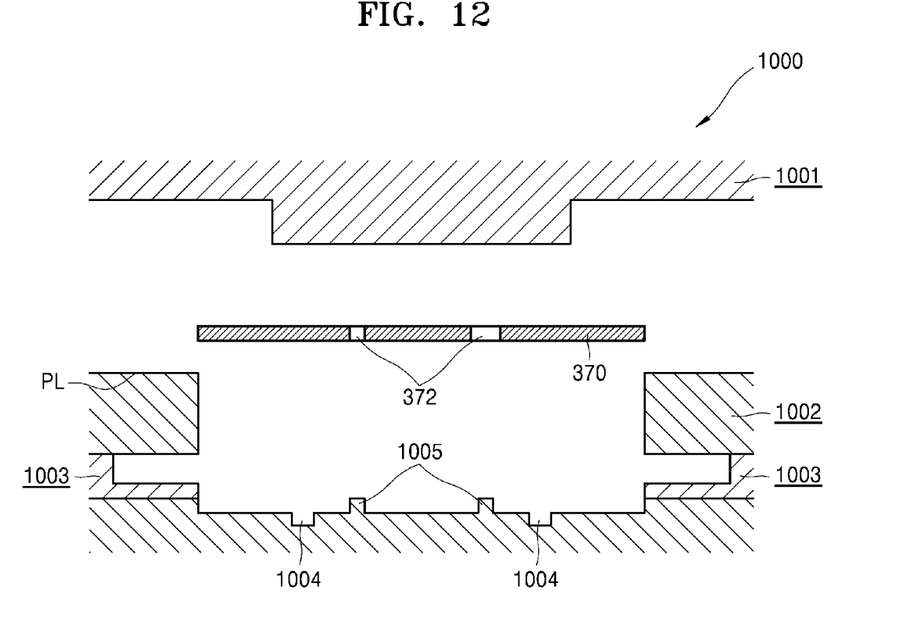
FIG. 12 is a diagram illustrating the circuit board of FIG. 11 that is inserted in a die set.

Referring to FIG. 12, positioning pins 1005 may be formed on the core 1002 of the die set 1000 for coupling with the positioning holes 372. In this example, the position of the circuit board 370 may be constantly maintained in the die set 1000.

Figure 13:
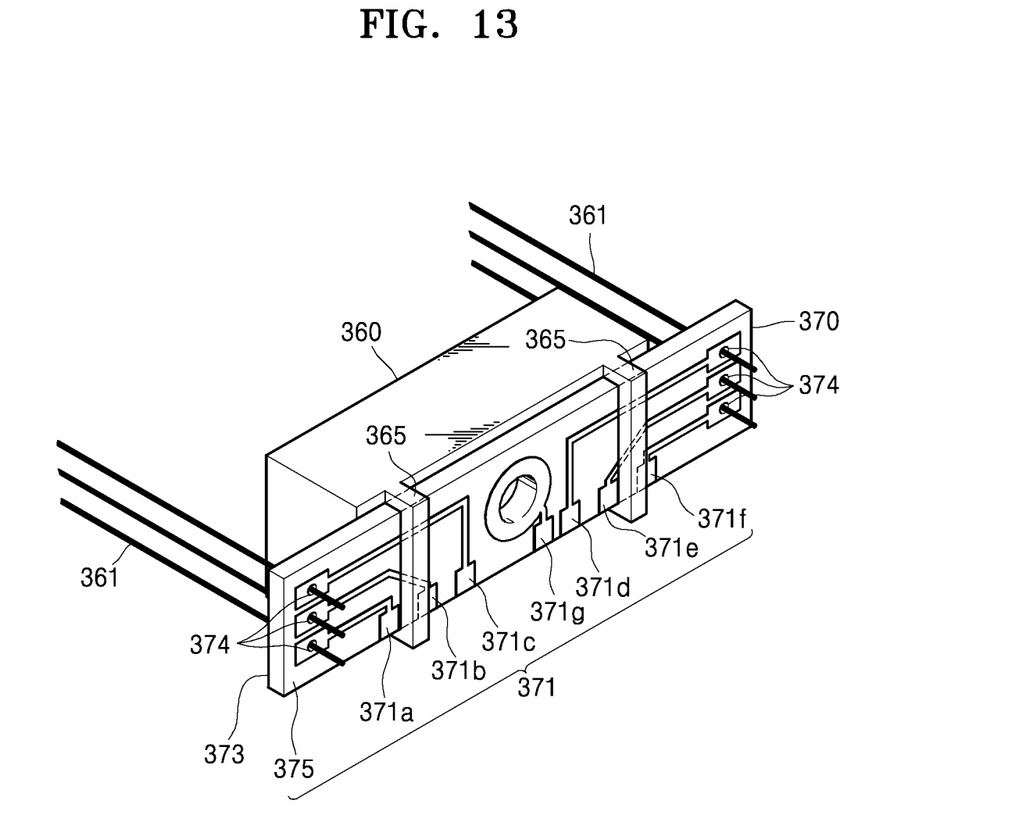
FIG. 13 is a diagram illustrating another example of a coupled relationship between a wire holder and a circuit board.

In the above-described examples, the wire holder 360 includes the surfaces 361. However, the embodiments of the present invention are not limited thereto. For example, if the second regions 370b of the circuit board 370 are spaced apart from the supporting surface 362, the second regions 370b may not face the opposite surfaces 361. As shown in FIG. 13, the wire holder 360 may not include opposite surfaces 361. In this case, undercuts are not formed in the wire holder 360, and thus the die set 1000 (refer to FIGS. 8A to 8C) does not include the slides 1003. That is, the structure of the die set 1000 may be simplified.

In the embodiments shown in FIGS. 10, 11, and 13, damping members such as the damping members 380 shown in FIGS. 5 and 6 may also be used.

According to various aspects, a circuit board may be stably coupled to a wire holder in an objective lens driving unit. Therefore, the circuit board may stably damp subsidiary resonance, and the coupling state of the circuit board and the wire holder may not deteriorate over time. Accordingly, the operational characteristics of the objective lens driving unit and the optical disc drive may not deteriorate. In addition, the objective lens driving unit may be stably operated, and the production efficiency of objective lens driving units may be improved.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An objective lens driving unit comprising:
a movable part comprising an objective lens and a driving coil;
a fixed part comprising a wire holder and permanent magnets corresponding to the driving coil;
a circuit board directly coupled to the wire holder by insert molding; and
suspension wires elastically supporting the movable part with respect to the fixed part, wherein ends of the suspension wires are fixed to the circuit board that is directly coupled to the wire holder, wherein the wire holder comprises:
a body comprising the supporting surface; and
a coupling portion extending away from the body and partially surrounding a portion of a second surface of the circuit board opposite to a first surface of the circuit board that is supported on the supporting surface.

2. The objective lens driving unit of claim 1, wherein the circuit board comprises:
a first region supported on a supporting surface of the wire holder; and
a second region extending from the first region and spaced apart from the supporting surface, wherein the ends of the suspension wires are fixed to the second region.

3. The objective lens driving unit of claim 2, wherein the wire holder comprises an opposite surface facing the second region of the circuit board with a gap therebetween, and a damping material is filled in the gap.

4. The objective lens driving unit of claim 1, wherein a positioning hole is formed in the circuit board to receive a positioning pin of an insert molding die.

5. The objective lens driving unit of claim 4, wherein a pair of positioning holes spaced apart from each other are formed in the circuit board, one of the positioning holes is a circular hole, and the other of the positioning holes is a hole elongated in a direction in which the positioning holes are spaced part from each other.

6. The objective lens driving unit of claim 1, wherein the objective lens comprises objective lenses corresponding to optical discs having different recording densities.

7. An objective lens driving unit comprising:
a movable part on which an objective lens is disposed;
a fixed part comprising a wire holder;
a circuit board directly coupled to the wire holder by insert molding; and
suspension wires each comprising a first end fixed to the movable part and a second end fixed to the wire holder that is directly coupled to the circuit board, wherein the wire holder comprises:
a body; and
a coupling portion extending away from the body to at least partially surround a portion of the circuit board.

8. The objective lens driving unit of claim 7, wherein the circuit board comprises a first region and second regions located on both sides of the first region, wherein the other ends of the suspension wires are fixed to the second regions, and
the wire holder further comprises a supporting surface on which the first region is supported and opposite surfaces having a height different from that of the supporting surface, wherein gaps are formed between the opposite surfaces and the second regions.

9. The objective lens driving unit of claim 8, wherein the coupling portion is disposed in the first region.

10. The objective lens driving unit of claim 8, wherein a first surface of the first region of the circuit board is supported on the supporting surface, and the coupling portion at least partially surrounds a portion of a second surface of the circuit board opposite to the first surface of the circuit board.

11. The objective lens driving unit of claim 10, wherein the coupling portion completely surrounds the second surface of the circuit board opposite to the first surface of the circuit board in a vertical direction of the circuit board.

12. The objective lens driving unit of claim 8, wherein a damping material is filled in the gaps between the second regions and the opposite surfaces.

13. The objective lens driving unit of claim 8, wherein a positioning hole is formed in the first region of the circuit board to receive a positioning pin of an insert molding die.

14. The objective lens driving unit of claim 13, wherein a pair of positioning holes spaced apart from each other are formed in the first region of the circuit board, one of the positioning holes is a circular hole, and the other of the positioning holes is a hole elongated in a direction in which the positioning holes are spaced part from each other.

15. The objective lens driving unit of claim 7, wherein the objective lens comprises objective lenses corresponding to optical discs having different recording densities.

16. An optical disc drive comprising:
a spindle motor configured to rotate an optical disc; and
an optical pickup unit configured to access the optical disc while sliding in a radial direction of the optical disc so as to record/read information, the optical pickup unit comprising an objective lens driving unit comprising:
a movable part on which an objective lens is disposed;
a fixed part comprising a wire holder;
a circuit board directly coupled to the wire holder by insert molding; and
suspension wires comprising ends fixed to the movable part and the other ends fixed to the wire holder that is directly coupled to the circuit board, wherein the wire holder comprises:
a body; and
a coupling portion extending away from the body to at least partially surround a portion of the circuit board.

17. The optical disc drive of claim 16, wherein the objective lens comprises objective lenses corresponding to optical discs having different recording densities.

* * * * *